Dec. 7, 1954   R. G. BOWEN   2,696,228
CUTTING CABLE FOR POWER SAWS
Filed May 4, 1949   3 Sheets-Sheet 3
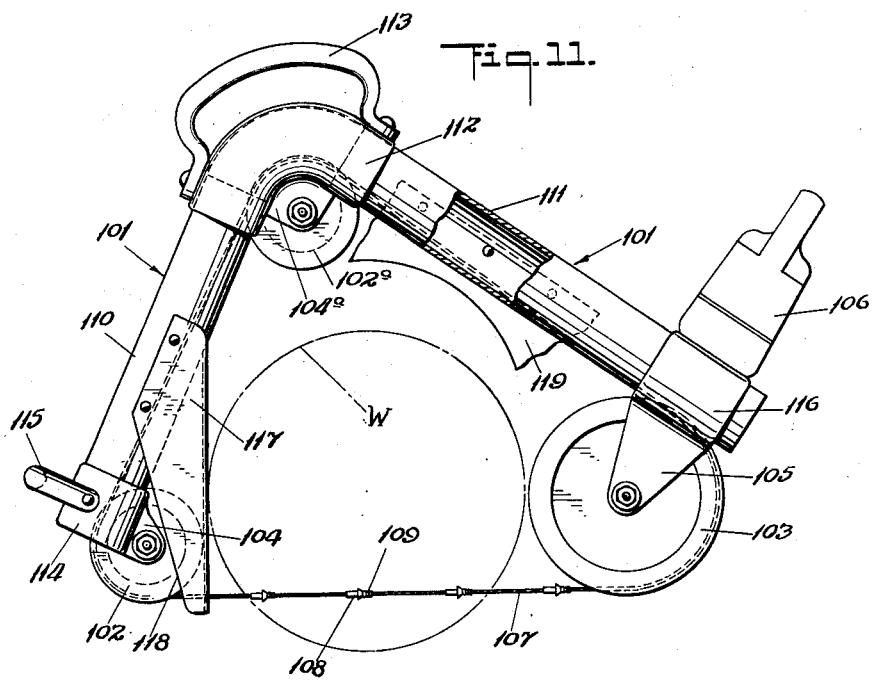
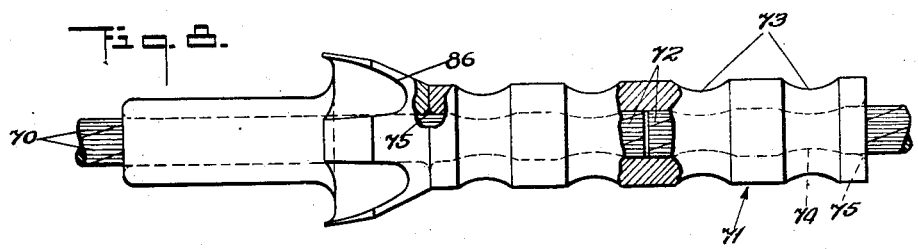
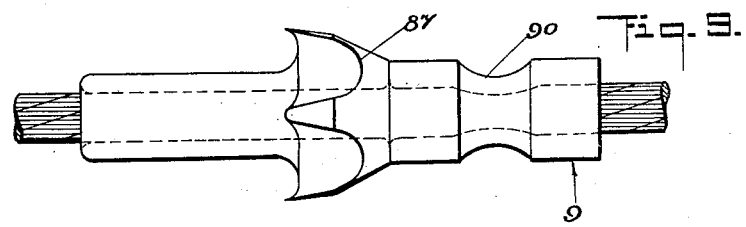
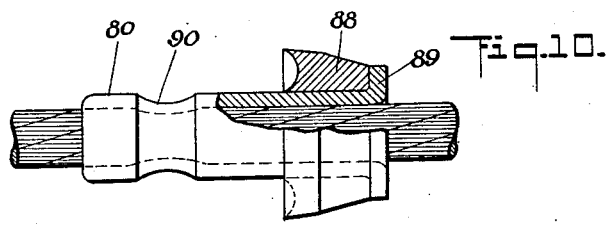
INVENTOR
RICHARD G. BOWEN
BY
Robert E Burns
ATTORNEY United States Patent Office 2,696,228
Patented Dec. 7, 1954

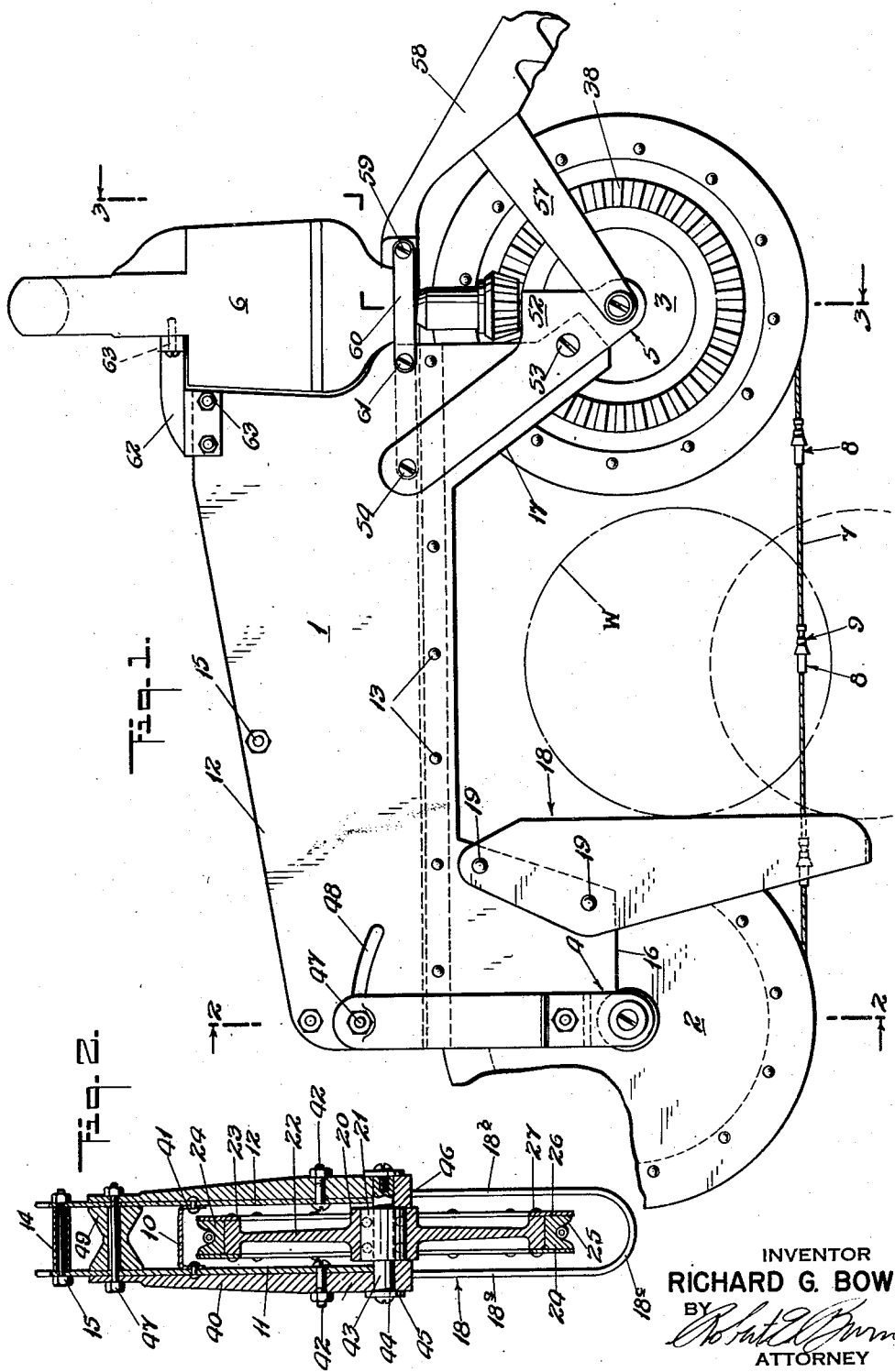

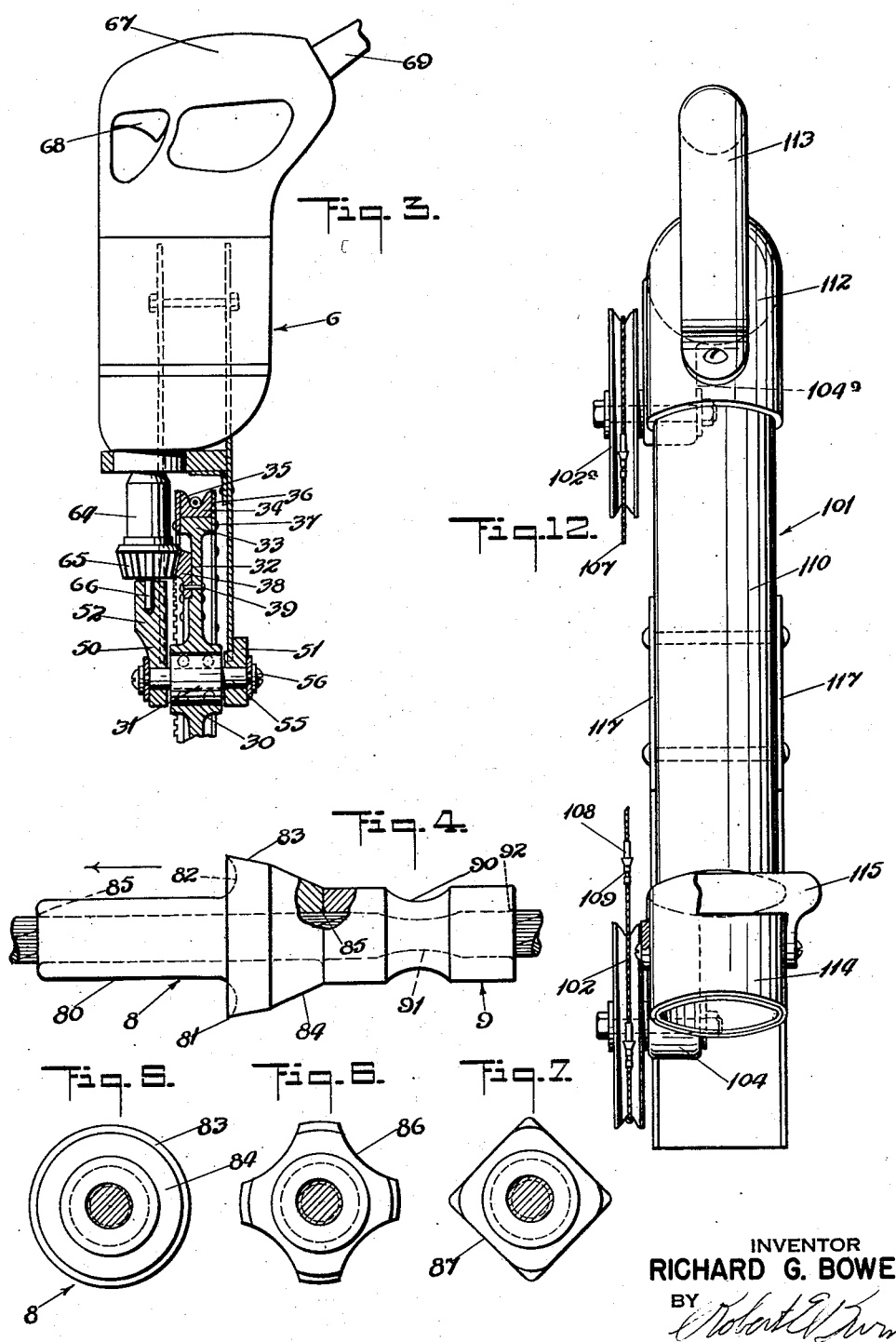

2,696,228

CUTTING CABLE FOR POWER SAWS

Richard G. Bowen, Hempstead, N. Y.

Application May 4, 1949, Serial No. 91,295

8 Claims. (Cl. 143—135)

The present invention relates to power operated cable saws and is particularly applicable to light weight portable saws.

In forestry, lumbering and tree surgery work, it is frequently necessary to cut off branches or to cut out the tops of the trees. In such instances, the tree surgeon or workman uses a ladder or climbs the trunk of the tree, for example by the use of climbing spurs and a rope or belt. He is hence in a rather precarious position and cannot safely use heavy or awkward equipment. The use of hand saws for such work is fatiguing and time consuming. Moreover, when a cut is made from the underside of a limb—as is desirable to avoid spreading—there is a tendency for the saw to bind, making its operation very difficult.

It is an object of the present invention to provide a portable power operated saw which is particularly suitable for use in trimming trees or in other instances where light weight and ease of handling are required. Another object of the invention is to provide a saw which is free cutting and capable of cutting in any direction without turning the saw. This makes it possible to cut either in a straight line or in any desired curve without binding or turning.

A further object of the invention is to provide a saw of simple and rugged construction that can be produced economically and will withstand hard use and abuse with low operating and maintenance cost. As the size and shape of the cutting elements and the manner in which they are mounted relieves these elements of the necessity of withstanding high tensile stress, they can, in accordance with the present invention, be formed of material such as high carbon steel or carbide having relatively low tensile strength but great hardness and resistance to wear. Such materials are hence capable of maintaining a sharp cutting edge over a long period of time. The simple shape of the cutting elements makes it feasible to form them of a material which is so hard as to be unsuitable for use in making more complicated shapes. Moreover, the cutting elements are of such small size that they can be made of relatively expensive material, for example special alloys, without increasing the cost of the saw beyond commercially competitive limits. The arrangement is such that the cutting elements can be sharpened either on or off the saw and can be easily, quickly and inexpensively replaced.

While the invention is particularly applicable to light weight portable saws, certain features are also applicable to larger portable saws, for example a two-man saw or a saw mounted on a running gear or vehicle, as well as to stationary saws for use in the factory, shop or home.

The objects and advantages of the invention will be more fully understood from the following description and claims, in conjunction with the accompanying drawings which show, by way of example, two embodiments of the invention.

In the drawings:

Fig. 1 is a side elevation of a light weight portable power operated cable saw embodying the present invention.

Fig. 2 is a cross-section approximately on the line 2—2 of Fig. 1.

Fig. 3 is a view partly in cross-section and partly in end elevation, as indicated by the line 3—3 in Fig. 1.

Fig. 4 is an enlarged side view of one of the cutting elements on the cable and a corresponding anchor element.

Fig. 5 is an end view from the front end of the cutting element of Fig. 4, the cable being shown in cross-section.

Figs. 6 and 7 are views similar to Fig. 5 but showing alternative forms of the cutting element.

Figs. 8 and 9 are side views, respectively, of the cutting elements shown in Figs. 6 and 7, portions of Fig. 8 being broken away to show the joining of the ends of the cable.

Fig. 10 is a side view, partly in section, of another form of cutting element.

Fig. 11 is a side elevation of a "two-man" power operated cable saw embodying the present invention, a portion of the same being broken away to show its construction.

Fig. 12 is an end view of the cable saw shown in Fig. 11 as seen from the left hand end.

The embodiment of the invention shown in Figs. 1, 2 and 3 is a light weight one-man portable cable saw suitable for use in limbing trees and for many other purposes. As illustrated in these figures, the saw comprises a chassis 1, a pair of grooved pulleys 2 and 3 rotatably mounted in spaced relation on the chassis by means of pulley supports 4 and 5, an electric motor 6 for driving one of the pulleys (3), an endless cable 7 running over and guided by the pulleys, a multiplicity of spaced cutting elements 8 which are carried by and coaxial with the cable and are of a particular configuration, as more fully described below, and a corresponding number of inter-elements 9 for positioning the cutting elements at spaced intervals along the cable and transmitting driving force from the cable to the cutting elements.

The chassis 1—as shown in the drawings—comprises a channel 10 and a pair of spaced parallel chassis plates 11 and 12 which are united with opposite flanges of the channel, for example by welding or by rivets 13. The upper portions of the chassis plates 11 and 12 are held in spaced relation by one or more spacer tubes 14 and bolts 15. Downwardly extending portions 16 and 17 of the chassis plates cooperate in providing convenient mountings for the pulley supports 4 and 5. The construction shown provides a strong chassis which can be easily and inexpensively fabricated and is light weight. The weight of the chassis can, if desired, be still further decreased, while maintaining adequate strength, by suitable cutouts in the chassis plates 11 and 12 and in the channel 10.

The cable saw illustrated in the drawings is provided with a steady rest 18 adapted to engage the limb or other work W that is being cut in order to position the saw with respect to the work and to take reaction forces resulting from the cutting operation. The steady rest is shown in the shape of a formed U bracket comprising spaced parallel portions 18a and 18b (Fig. 2) which are connected, for example by bolts 19, with the downwardly extending portions 16 of the chassis plates and are joined at their lower ends by a curved portion 18c. The work-engaging edge of the steady rest is just outside the periphery of the pulley 2 in a direction toward the pulley 3 and is shown approximately perpendicular to a line connecting the axes of the two pulleys although it may, if desired, be inclined so that the reaction forces of the work against the steady rest have a component tending to move the work into the saw.

The pulleys 2 and 3 are of similar construction and are rotatably mounted in spaced relation on the chassis 1. Pulley 2 is shown as an idler pulley having a hub portion 20 providing a housing for ball bearings 21, radially projecting web portions 22 and a periphery of rim portion 23. Alternatively, sheet metal stampings may be used for the idler and driven pulleys to improve their weight-strength ratio. On its periphery, the pulley is provided with a rubber seating ring 24 for the cable assembly, the outer periphery of the ring being grooved as indicated at 25 to receive the cable. The cable seating ring 25 is held by spaced retainer rings 26 secured to opposite sides of the rim portion 23 of the pulley, for example by rivets 27. The grooved ring 24 is formed of a composition having high abrasion resistance yet sufficiently soft that the cutting elements 8 and anchor elements 9 will sink into the ring 26 as the cable runs over the pulley.

The driven pulley 3 (Figs. 1 and 3) is of similar or identical construction—except for the driving means—and comprises a hub portion 30 housing ball bearings 31, web portion 32, rim 33 and a rubber cable seating ring 34 having a groove 35 and mounted on the pulley by retainer rings 36 secured, for example by rivets 37, to the rim portion 33. The pulley is driven by means of a ring gear 38 which may be formed integrally with the pulley but is shown in the form of a separate toothed ring secured to the web portion 32 of the pulley, for example by means of rivets 39.

The pulley support 4 for the idler pulley 2 (Figs. 1 and 2) comprises opposed bracket arms 40 and 41 which are pivotally connected by means of pivot bolts 42 to the downwardly extending portions 16 of the parallel chassis plates 11 and 12. The lower ends of the arms 40, 41 have aligned apertures to receive a shaft 43 which is held in position by screws 44 and washers 45. The idler pulley 2 is rotatably supported on the shaft 43 by the above mentioned bearings 21. Inwardly projecting bosses 46 are preferably provided on the lower ends of arms 40, 41, as shown, to assist in maintaining the correct centering and alignment of the pulley. The upper ends of the arms 40, 41 are also apertured to receive a connecting and clamping bolt 47 which passes through arcuate slots 48 in the chassis plates 11 and 12 and also through a spacing and clamping spool 49 disposed between the chassis plates, the length of the spool being substantially equal to the distance between the two plates. The arcuate slots 48 in the chassis plates 11, 12 are centered on the pivot bolts 42 by means of which the bracket arms 40, 41 are pivotally mounted on the chassis. This arrangement permits the pulley supporting arms 40, 41 to be swung about the axis of the pivot bolts 42 to move the idler pulley 2 forward or away from the driven pulley 3 and thereby vary the tightness of the endless cable 7. The pulley is held in adjusted position by tightening the clamping bolt 47.

The pulley support for the driven pulley 3 comprises a pair of spaced bracket arms 50 and 51 which are similar to one another except that the front bracket 50 is provided with a boss 52 affording a bearing support for a driving pinion, as described below. The bracket arms 50, 51 are mounted on the chassis by means of bolts 53 passing through holes in the lower portions of the brackets and the downwardly extending portions 17 of the respective chassis plates 11 and 12 and by a bolt 54 which passes through holes in the upper ends of both arms and both chassis plates. The downwardly projecting lower ends of the bracket arms 50, 51 are apertured to receive a shaft 55 for rotatably supporting the pulley 3. The chassis is held in place by screws 56 which pass through holes in the lower ends of a U-shaped bracket 57 for supporting a hand grip 58. The lower ends of the bracket 57 overlap the lower ends of the pulley-supporting bracket arms 50, 51 (Fig. 3) and are held by the screws 56 threaded into opposite ends of the shaft 55. The hand grip 58 is secured to the bracket 57, for example by screws, while the upper end of the hand grip is held by a bolt 59. The bracket 57, in conjunction with the arms 50, 51, the hand grip 58 and the chassis, thus forms a strong triangular structure securely supporting both the pulley and the hand grip with minimum weight. Moreover, it will be noted (Figs. 2 and 3) that a central plane passing through the cable grooves of the pulleys coincides with the central plane of the chassis and that the upper portions of the pulleys lie inside the downwardly turned chassis channel 10. This symmetrical and compact arrangement of the pulleys makes it possible to use a light weight chassis while still providing adequate strength. A further advantage is that the return run of the cable lies between the flanges of the channel-shaped chassis member which thus serves as a guard or protector for this portion of the cable.

The driving motor 6 (Figs. 1 and 3) is preferably a light-weight, high power, electric motor, for example a hi-cycle motor such as the 180 cycle motors used on heavy duty drills. The motor is mounted on the chassis by means of a lower motor support 60 in the form of a split collar held by the aforementioned bolts 54 and 59 and an additional bolt 61 and an upper motor support 62 held by bolts 63. The motor shaft 64 projects downwardly and carries a driving pinion 65 meshing with the ring gear 38 on the driven pulley 3. The pinion 65 and gear 38 provide a speed reduction. Additional speed reducing gears are provided between the rotor of the motor and the pinion 65, if further speed reduction is desired. The cable should, however, run at relatively high speed, for example a speed of from 1200 to 1500 feet per minute. The pinion shaft 64 has a bearing imbedded at pinion end into which dowel pin 66 extends from boss 52 of the bracket arm 50. The outboard support of the pinion shaft assures proper meshing of the gears with minimum weight requirements for bearings and supports. At the upper end of the motor housing there is provided a hand grip 67 and trigger switch 68. A cord 69 supplies power to the motor.

The cable 7 runs in the grooves of the rubber rings provided on the peripheries of the pulleys 2 and 3 and is driven by the motor acting through the pinion 65, gear 38 and pulley 3. While the cable may comprise a single strand of high tensile strength wire, e. g. piano wire, it is preferable to use a multiple strand twisted cable formed of high tensile steel or alloy. In the embodiment shown in the drawings (Fig. 8) the cable comprises a plurality of twisted strands 70, each strand consisting of a plurality of small wires. The cable should have a high tensile strength and sufficient flexibility to run freely over the pulleys. In a saw for cutting tree limbs and small trees, for example up to a foot or 18 inches in diameter, the cable is preferably of the order of $1/16$ to $1/8$ inch in diameter. While the cable may initially be made in endless form, it has been found more expedient to cut a piece of cable of proper length and join the ends to form an endless band. The ends of the cable are joined, for example by welding or silver solder, or, as illustrated in the drawings, by means of a sleeve 71 which encases and joins the abutting ends 72 of the cable. The ends of the cable fit snugly into the sleeve 71 and are united with the sleeve, for example by welding, soldering or brazing. However, I have found it expedient to secure the ends of the cable in the sleeve by a swaging operation which may be employed instead of, or in addition to, welding, brazing or soldering. The ends of the cable are introduced equal distances into the sleeve 71 which is initially of uniform diameter. The sleeve is then swaged in at one or more bands in the portion occupied by each end of the cable, as indicated at 73, a total of four bands of swaging being illustrated in the drawings (Fig. 8). The swaging is done by tools having a radius so that the grooves formed by the swaging operation are arcuate or curved in cross-section. The swaging causes the sleeve to grip the cable tightly. At the bands of swaging the cable may be necked in slightly, as indicated at 74. However, the principal action is that the metal of the sleeve is forced into the groove and interstices between the strands and the individual wires making up the cable so that a tight interlocking grip on the cable is assured. The sleeve 71 is preferably formed of a tough and fairly hard, although malleable, steel or alloy, such for example as chromium molybdenum steel. The metal should be in normalized condition. At the ends of the sleeve 71, the inner edges are preferably rounded, as indicated at 75, to avoid any cutting of the cable.

The cable 7 carries a plurality of cutting elements 8 which are preferably located at widely and uniformly spaced points along the cable, as illustrated in Fig. 1. Several alternative forms of cutting elements are shown by way of example in Figs. 4 to 10. As the cutting elements shown in these figures are of the same general configuration, the same reference numerals are used for like parts. Referring first to Figs. 4 and 5, the cutting element 8 comprises a tubular portion 80 and an enlarged tooth or flange portion providing an annular cutting edge 81. The front face of the tooth is curved or arcuate, as indicated at 82, and merges smoothly into the tubular portion 80 which projects forwardly from the cutting edge, the direction of travel being indicated by an arrow in Fig. 4. The length of the forwardly projecting portion 80 is preferably at least equal to the maximum diameter of the cutting element. The outer face of the tooth portion to the rear of the cutting edge 81 is tapered, as indicated at 83, preferably at an angle of approximately 5 to 10 degrees to the axis of the cable. The tapered or frustoconical portion 83, in conjunction with the arcuate or parti-toroidal portion 82, forms a relatively sharp cutting edge. To the rear of the portion 83, the cutting element is shown more sharply tapered at 84 to a diameter approximately equal to, or slightly greater than, that of the tubular portion 80. At the end of the cutting element, the inner edges are preferably rounded, as shown at 85. The cutting element shown in Fig. 4 fits snugly on the cable so as to avoid looseness and chattering but is not so tight as to prevent turning of the element on the cable.

The form of tooth shown in Figs. 6 and 8 differs from that of Figs. 4 and 5 in that the cutting edge is interrupted by a plurality (four) of arcuate notches 86 which can readily be formed by a grinding operation. This provides a pronged or interrupted cutting edge, as distinguished from the annular cutting edge of Figs. 4 and 5.

Figs. 7 and 9 show another cutting element with an interrupted cutting edge, the interruptions in this instance being formed by a plurality (four) of flattened surfaces 87 which can likewise be formed by grinding.

In the embodiments of Figs. 4 to 9, the entire cutting element is formed of carbide, steel or alloy which is sufficiently hard, or has such hardening characteristics as to provide a sharp and lasting cutting edge. With suitable steels or alloys, the cutting element may be differentially hardened so that the cutting edge is harder than other portions.

In the embodiment of Fig. 10, the tooth portion is formed of a separate annular member 88 formed of different material from the tubular portion 80. For example, the tooth portion 88 may be formed of carbide or of a hard steel or alloy while the tubular portion 80 is relatively soft. A flange 89 at the rear end of the tubular portion 80 retains the tooth portion 88 in place. As the tubular portion 80, including the flange 89, can be made from tubular stock by a simple flanging operation, this form of tooth can be expeditiously and economically produced. It will be understood that the tooth portion 88 may take other forms, such, for example, as those illustrated in Figs. 6 to 9.

The cutting element illustrated in Fig. 10 is shown as being locked to the cable by a swaging operation, as indicated at 90. The construction of the cutting element permits use of a very hard material for the cutting edge and a softer material for the tubular portion 80 so that the latter can readily be swaged.

In the embodiments shown in Figs. 4 and 9, the cutting elements are positioned on the cable by back-up sleeves or anchor elements 9 which are locked to the cable by a swaging operation. It has been found that a single band of swaging, as indicated at 90, is generally sufficient although additional bands may be used if desired, e. g. for extra heavy work. The back-up sleeve 9 is essentially the same as the sleeve 71 described above and shown in Fig. 8 for joining the ends of the cable, except that the back-up sleeve is preferably somewhat shorter. The swaging operation is the same as described above, the material of the sleeve being forced into the grooves and interstices of the cable and the cable being necked in slightly, as indicated at 91. At each end of the back-up sleeve 9, the inner edges of the sleeve are preferably rounded, as indicated at 92, to avoid cutting the cable. The cable is thus gripped at the central portion of the sleeve and is relatively free of the sleeve at the end portions of the latter. Sharp concentration of stress in the cable is thereby avoided. Sleeves 9 can, if desired, be provided both fore and aft of the cutting elements 8. However, it has been found preferable to provide the sleeves only to the rear since the cutting elements have no detrimental forward movement on the cable when the saw is in operation. Although the swaging operation described above has been been preferable, the back-up sleeves 9 or the cutting elements themselves may alternatively be welded, brazed, soldered, or otherwise secured to the cable.

As seen in Fig. 8, the sleeve 71 for joining the ends of the cable may be used as a back-up sleeve for one of the teeth. The diameter of the sleeve 71, like that of the back-up sleeves 9, is substantially smaller than that of the cutting edges of the cutting elements 8 and is preferably about the same as that of the tubular portion 80 of the cutting elements. For best results, the space between successive cutting elements along the cable should be greater than the axial length of a cutting element, the elements being preferably quite widely spaced, as illustrated in Fig. 1. It will be seen that between the cutting elements, the cable is free and unrestricted and is thus free to bend in passing over the pulleys so that bending is distributed over a considerable length and concentrated bending stresses in the cable are avoided. All of the cutting elements may be alike or alternatively prong type cutters, such as those shown in Figs. 6 to 9, may alternate with cutters having continuous circular cutting edges.

The operation of the cable saw will be readily apparent from the foregoing description. The operator grasps handle 58 with his left hand and handle 67 with his right hand and squeezes the trigger switch 68 to start the motor. The saw is normally applied to the work in the manner illustrated in Fig. 1 where the work is shown in two different stages, the saw being moved into the work as the cutting progresses. The steady rest 18 engages the work and takes the reaction of the force exerted on the work by the cutting elements so that virtually no reaction is transmitted to the operator. While the normal movement of the saw in making a straight cut is in a direction parallel to the work-engaging edge of the steady rest 18, the saw will cut in any direction without the necessity of turning the saw. The cutting portion of the cable is merely moved in the direction it is desired to cut. Hence a curved cut can readily be made. Moreover, the saw will not bind or jam but will always cut its way out in the event the previously cut edges are forced together, for example by the weight of a limb when a cut is being made from the underside. The teeth are shaped so as to permit chips or shavings to curl toward the cable and forwardly into the open area between the cable and the saw slot, thus preventing chip jamming or clogging. Moreover, the teeth are balanced so as to uniformly resolve drag components into up and down forces along the cable surface. The saw has been found to have particularly free cutting characteristics.

As the teeth are preferably made of heat treatable material and hardened to Rockwell "C" scale 50–55, the cutting edges will maintain their sharpness for a long period of time. When sharpening becomes necessary, the teeth can be ground by means of a suitable centerless grinding, the tooth being rotatable on the cable. Alternatively, the cable unit can economically be replaced.

In Figs. 11 and 12, there is shown a second embodiment of my invention intended for use as a two-man saw. This embodiment comprises a chassis 101, two idling pulleys 102 and 102a and a driven pulley 103 rotatably supported on the chassis by pulley supports 104, 104a and 105, respectively, a motor 106 for driving the pulley 103, a cable 107 running over the three pulleys, cutting elements 108 carried by the cable and back-up sleeves 109 for positioning the cutting elements on the cable.

The chassis 101 comprises two tubular sections, 110 and 111, disposed at an angle of approximately 80 degrees to one another and united by a tubular elbow 112 which carries the pulley support 104a. The elbow 112 also carries a hand grip 113 secured to the elbow by a rivet or in other suitable manner. A sleeve or collar 114 carried by the lower or free end of the tubular member 110 carries the pulley support 104 and also a hand grip 115. The pulley support 105 is carried by a split sleeve or collar 116 slidably mounted on the tubular section 111. The collar 116 also provides a mounting for the motor 106 which drives the pulley 103. The tightness of the endless cable 107 is adjustable by sliding the collar 116 longitudinally on the tubular section 111 whereupon the collar is locked in place, for example by a clamping bolt. A steady rest 117 adapted to engage the work is carried by the tubular section 110. To provide adequate strength and stiffness with minimum weight, the steady rest 117 is preferably of semi-circular channel section, the upper part of which embraces, and is secured to, the tubular section 110. The lower portion of the steady rest is preferably tapered, as indicated at 118. A sheet metal guard member 119 is carried by the tubular section 111.

The chassis assembly is preferably formed of magnesium or aluminum alloy, the sections 110 and 111 being formed of large-diameter, thin wall tubing, while the elbow 112, collars 114 and 116 and associated pulley supports, hand grips and other fittings are of light weight casting.

The configuration of the chassis and the arrangement of the pulleys makes it possible to cut a large diameter limb or tree with a very compact and light weight saw. A further feature of this embodiment is that, by having the driven and idler wheels all on one side of the chassis, the cable assembly can be quickly installed or removed merely by loosening the collar 116 and sliding it on the tubular section 111. While the saw shown in Figs. 11 and 12 is intended primarily as a two-man saw, the arrangement of the hand grips is such that it can be used by a single operator if desired.

Except for the greater length of cable required, the cable assembly is the same as previously described.

It will be understood that individual features of the several modifications shown are mutually interchangeable with one another and that other modifications may be made within the scope of the appended claims, the embodiments illustrated in the drawings being shown and described merely by way of example.

What I claim and desire to secure by Letters Patent is:

1. In a cable saw having a chassis, a plurality of grooved pulleys rotatably mounted in spaced relation on the chassis and power means for driving one of the pulleys, an endless cable adapted to run on said pulleys, and a multiplicity of cutting elements coaxial with and carried by said cable, said elements being rotatable and slidable on said cable, each of the cutting elements comprising a circular cutting edge facing forwardly in the direction of cutting and a fixed tubular stem portion of smaller diameter than the cutting edge projecting ahead of the cutting edge and closely surrounding the cable, the length of said stem being greater than the diameter of the cutting edge and a corresponding number of tubular anchor elements affixed to the cable at spaced points along the cable, whereby the cutting elements are carried along by the cable and the anchor elements and are maintained in spaced relation to one another when the cable is driven by said driving means, portions of the cable being free between said anchor elements and the succeeding cutting elements and the free space between successive cutting elements being greater than the axial length of said cutting elements.

2. In a cable saw having a chassis, a plurality of grooved pulleys rotatably mounted in spaced relation on the chassis and power means for driving one of said pulleys, an endless cable adapted to run on said pulleys, a multiplicity of cutting elements positioned at spaced points along the cable, each cutting element comprising a tubular portion surrounding the cable, an outwardly projecting flange at the rear end of said tubular portion and an annular cutting disc surrounding said tubular portion and seated against said flange, said disc being of harder material than said tubular portion and having at its periphery a cutting edge facing forwardly in the direction of cutting, and means for anchoring said cutting elements against rearward movement on said cable to maintain the spacing of said cutting elements during cutting operation.

3. In a cable saw, a cable, and a plurality of spaced cutting elements strung on and carried by the cable, each cutting element comprising a tubular portion surrounding the cable, an annular radially projecting tooth portion at the rear end of said tubular portion and a cutting edge at the periphery of the tooth portion and facing forwardly in the direction of cutting, the front face of said tooth portion curving concavely inwardly from said cutting edge and merging smoothly into said tubular stem portion, and means for anchoring said cutting elements against rearward movement on said cable to maintain the spacing of said cutting elements during cutting operation, portions of the cable between the cutting elements being free.

4. In a portable cable saw having a light frame provided with handle portions and adapted to be held by hand, a plurality of grooved pulleys rotatably mounted in spaced relation on the frame, a motor mounted on said frame and driving connections between the motor and one of the pulleys, an endless flexible cable adapted to run on and be guided by said pulleys, a multiplicity of cutting elements coaxial with and carried by the cable, said cutting elements being disposed at widely spaced points on said cable with a space between successive elements several times greater than the axial length of each element, each of the cutting elements comprising a circular cutting edge facing forwardly in the direction of cutting and a fixed tubular stem portion closely surrounding the cable and projecting ahead of the cutting edge, and means for anchoring said cutting elements against rearward movement on said cable to maintain the spacing of said elements during cutting operation, portions of the cable between said elements being free.

5. In a cable saw having a frame, a plurality of grooved pulleys rotatably mounted in spaced relation on the frame and power means for driving one of the pulleys, an endless cable adapted to run on said pulleys, a multiplicity of cutting elements coaxial with and carried by the cable, said cutting elements being disposed at widely spaced points on the cable with a free space between successive elements greater than the axial length of each element, each of the cutting elements comprising a circular cutting edge facing forwardly in the direction of cutting and a fixed tubular stem portion of smaller diameter than the cutting edge projecting ahead of the cutting edge and closely surrounding said cable, the length of said stem being greater than the diameter of the cutting edge, and means for anchoring said cutting elements against rearward movement on said cable to maintain the spacing of said elements during cutting operation, portions of the cable between said elements being free.

6. In a cable saw having a frame, a plurality of grooved pulleys rotatably mounted in spaced relation on the frame and power means for driving one of the pulleys, an endless cable adapted to run on said pulleys, a multiplicity of cutting elements coaxial with and carried by the cable, said cutting elements being disposed at spaced points on the cable with a free space between successive elements greater than the axial length of each element, each of said cutting elements comprising a tooth having a circular cutting edge facing forwardly in the direction of cutting and a fixed tubular stem portion of smaller diameter than the cutting edge closely surrounding the cable and projecting ahead of the cutting edge, the front face of the tooth as viewed in longitudinal section being concavely curved inwardly from said cutting edge and merging smoothly into the tubular stem portion, and means for anchoring said cutting elements against rearward movement on said cable to maintain the spacing of said elements during cutting operation, portions of the cable between said elements being free.

7. In a cable saw having a chassis, a plurality of grooved pulleys rotatably mounted in spaced relation on the chassis and power means for driving one of the pulleys, an endless cable running over said pulleys, a multiplicity of spaced cutting elements carried by and rotatable about the axis of said cable, each of the cutting elements comprising a tubular stem portion surrounding the cable, an annular radially projecting tooth portion at the rear end of said tubular stem and a cutting edge at the periphery of said tooth portion and facing forwardly in the direction of cutting, the front face of the tooth portion being concavely curved inwardly from said cutting edge and merging smoothly into the tubular stem portion, and means for anchoring said cutting elements against rearward movement on said cable to maintain the spacing of said elements during cutting operation, portions of the cable between said elements being free, the free space between successive cutting elements being greater than the axial length of said tubular portion.

8. In a cable saw having a chassis, a plurality of grooved pulleys rotatably mounted in spaced relation on the chassis and power means for driving one of said pulleys, an endless cable running over said pulleys, a multiplicity of cutting elements positioned at spaced points along the cable, each of said cutting elements comprising a tubular portion secured to the cable by an annular constricted portion spaced from the ends of said tubular portion, an annular radially projecting tooth portion at the rear end of said tubular portion and a cutting edge at the periphery of said tooth portion and facing forwardly in the direction of cutting, the front face of the tooth portion being concavely curved inwardly from the cutting edge and merging smoothly into said tubular portion, portions of the cable between said elements being free.

References Cited in the file of this patent

UNITED STATES PATENTS

| Number | Name | Date |
|---|---|---|
| 641,129 | Luce et al. | Jan. 9, 1900 |
| 659,348 | Mercer | Oct. 9, 1900 |
| 1,457,761 | Wilson | June 5, 1923 |
| 1,490,038 | Smith | Apr. 8, 1924 |
| 1,520,422 | Lind | Dec. 23, 1924 |
| 1,601,201 | Daw | Sept. 28, 1926 |
| 1,645,552 | Tannewitz | Oct. 18, 1927 |
| 1,770,207 | Helmling | July 8, 1930 |
| 1,780,627 | Muller | Nov. 4, 1930 |
| 1,907,345 | Cornish | May 2, 1933 |
| 1,967,116 | Gerdetz | July 17, 1934 |
| 2,017,149 | Greening | Oct. 15, 1935 |
| 2,038,535 | Brenizer | Apr. 28, 1936 |
| 2,049,172 | Osgood | July 28, 1936 |
| 2,233,086 | Shreffler | Feb. 25, 1941 |
| 2,380,753 | Segerstad | July 31, 1945 |

FOREIGN PATENTS

| Number | Country | Date |
|---|---|---|
| 436,171 | France | Jan. 16, 1912 |
| 437,117 | France | Feb. 9, 1912 |
| 78,568 | Switzerland | Aug. 1, 1918 |